Feb. 2, 1954
F. F. STADELHOFER
2,668,066
COUPLING MEANS FOR TUBULAR CASING
Filed Feb. 10, 1951
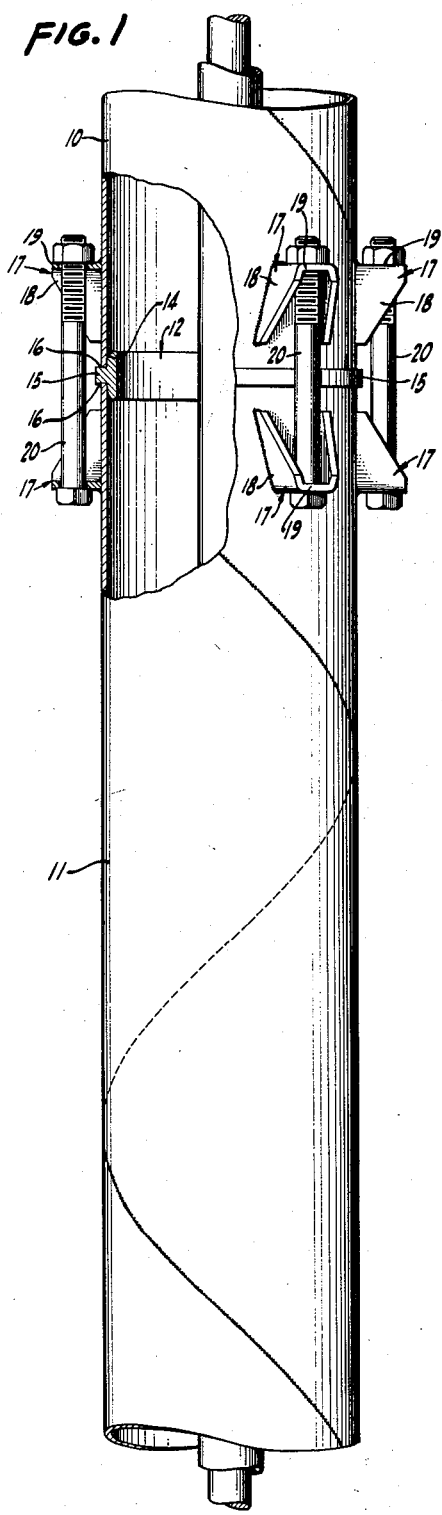
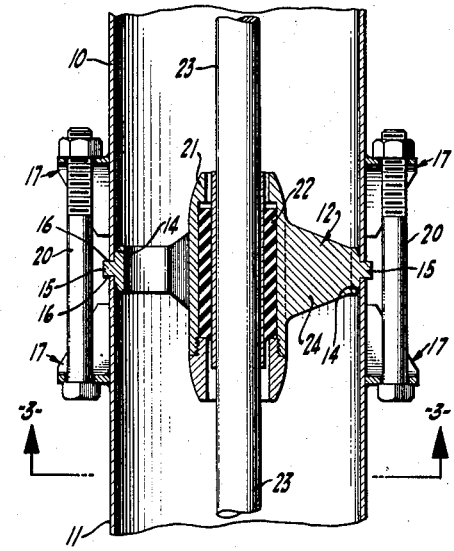
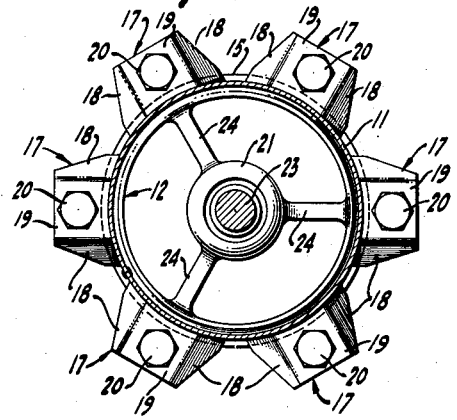
INVENTOR.
FRED F. STADELHOFER
BY
Mellin and Hanscom
ATTORNEYS

Patented Feb. 2, 1954

2,668,066

UNITED STATES PATENT OFFICE 2,668,066

COUPLING MEANS FOR TUBULAR CASING

Fred F. Stadelhofer, Berkeley, Calif., assignor to Berkeley Pump Company, Berkeley, Calif., a corporation of California Application February 10, 1951, Serial No. 210,331

1 Claim. (Cl. 285—131)

This invention relates to a coupling means for coupling the adjacent ends of relatively large tubing having a relatively thin wall such as spirally welded casing for use in casing water wells.

It is the principal object of my present invention to provide an improved coupling means for coupling together the adjacent ends of light tubular casing in a fluid-tight manner, which coupling means is simple and inexpensive to produce and can be easily and quickly applied to the tubing ends to effect an efficient coupling thereof.

It is a further object of my invention to provide a coupling means of the character referred to which will effect precise alignment of the ends of the coupled tubing upon application of the coupling means thereto.

It is a further object of my invention to provide a coupling means of the character referred to which may include a central journal member, and which will not only properly align the ends of the coupled tubing but will rigidly support the journal member in a correct relative position axially of the tubing.

One form which the invention may assume is exemplified in the following description and illustrated by way of example in the accompanying drawings, in which:

Fig. 1 is a view in elevation of the adjacent ends of two sections of spirally welded casing, showing such ends coupled together by my improved coupling means, with parts broken away and in central vertical section to show certain details of construction.

Fig. 2 is a central vertical section through the adjacent ends of two sections of well casing coupled together by my improved coupling means, and illustrating a slightly modified form of the invention, in which the coupling means is fitted with a central journal member for supporting a pump drive shaft in a precise, proper aligned relationship with the casing.

Fig. 3 is a transverse sectional view taken on line 3—3 of Fig. 2, showing the cricular distribution of the clips which are welded to the casing and connected by means of bolts to effect the couple between the adjacent ends of the well casing.

Referring more particularly to the accompanying drawings, 10 and 11 indicate the adjacent ends of two sections of tubular casing. This steel casing is of the type of relatively large diameter with a relatively thin wall, such as spirally welded steel casing used in water wells. This tubular casing is used in the approximate range of six to ten inches in diameter, and in some instances is made of twelve gauge sheet steel.

It is highly desirable to effect a coupling between adjacent sections of the casing, particularly when it is used in water wells, which will place the casing ends in exact alignment and so connected that there will be no leakage at the junction between the adjacent ends of the tubing sections.

My improved coupling means includes a circular aligning band 12 of an external diameter agreeing with the internal diameter of the casing sections 10 and 11, so that the adjacent ends of the casing sections 10 and 11 may snugly telescope over the opposite ends of the aligning band 12. At its opposite ends the peripheral surface of the aligning band 12 is tapered radially inward as at 14 for the purpose of ease in pressing the ends of the casing sections over the external periphery of the band.

The aligning band is formed with a concentric annular sealing ring 15, which is of an external diameter not less than the external diameter of the casing and preferably slightly greater, as illustrated. The sealing ring 15 has opposite sealing faces 16 which are transverse with respect to the axis of the aligning band 12, which faces are spaced longitudinally inward from opposite ends or side faces of the aligning band 12, as illustrated.

It is intended that the adjacent ends of the casing sections 10 and 11 telescope over opposite ends of the aligning band 12 and abut tightly against the sealing faces 16 of the annular sealing ring 15. I prefer, before using the coupling member to couple the ends of the casing sections 10 and 11, to make the ends of the casing sections 10 and 11 perfectly transverse with respect to the axis of the casing, so that they will tightly abut throughout their entire circumference against the sealing faces 16 of the annular sealing ring 15. Obviously, when the adjacent ends of the casing sections 10 and 11 are telescoped over the aligning band 12, they will be brought into almost precise longitudinal alignment.

For the purpose of securing the ends of the casing sections 10 and 11 together in a firm manner and also for tightly pressing the ends thereof into sealing engagement with the faces 16 of the sealing ring 15, I provide a series of radially extending clips 17 at the exterior of each casing section 10 and 11. The clips of each casing section 10 and 11 are arranged about the periphery of the casing and uniformly spaced thereabout and positioned a distance short of the end of the casing. The clips, as illustrated, are U-shaped sheet metal clips with the legs 18 thereof directed toward the end of the casing section and with a flat transverse section 19 projecting radially outward from the casing. These clips are inexpensive to manufacture and are welded in place to the exterior of the casing. The radial portions 19 of the clips are drilled to receive connecting bolts 20 which may be of an inexpensive type such as machine bolts.

When the clips of the two sections are connected together by the connecting bolts 20 and the same are tightened, the ends of the casing sections 10 and 11 will be drawn toward each other and pressed in firm sealing contact with the faces 16 of the sealing ring 15. The contact of the thin end wall of the casing sections is of such small area that when a coupling force is exerted by tightening the connecting bolts 20, a very effective seal is made between the casing ends and the sealing ring 15 and in this way makes a gasketless joint. In actual practice I have tested this joint to 400 pounds p. s. i. and there was no sign of leakage at the joint.

I prefer that the aligning band 12 with its integral sealing ring 15 be formed of bronze or some similar non-ferrous metal so that there will be no effective rusting of the casing to the sealing ring, which enables the joint to be easily broken if desired. In the event that the connecting bolts 20 rust fast and the ends thereof cannot be released, it is only necessary to saw the bolts 20 in half and the casing section can be easily uncoupled.

In Fig. 2 I have shown a modified form of my invention in which there is disposed at the axial center of the aligning band 12 a journal member 21 for receiving a rubber bearing 22 or the like in the event that the casing is to house a pump shaft such as 23. The journal member 21, however, may be a pipe clamp for holding pipe tubing when the device is used in conjunction with a turbine type pump. The journal member 21 is connected by circumferentially spaced rigid spider arms 24 to the aligning band 12.

Obviously, the aligning band 12 and the journal 21 being relatively rigid and perfectly concentric, when the coupling between the adjacent ends of the sections 10 and 11 of the casing is effected, not only will the casing sections be positioned in perfect alignment but the journal section 21 will likewise be in proper central position with respect thereto. This, of course, is important in water well casings when a pump shaft is required to be journaled in the casing at spaced points therealong.

I also desire to point out here that the external diameter of the coupling means is maintained at a minimum. This, in some instances, is an important feature.

In utilizing the coupling means herein disclosed, I prefer that the ends of the casing sections 10 and 11 be first placed in a lathe or like tool and the ends of the pipe cut off or turned so that the edge thereof around its complete circumference lies in the same plane and at perfect right angles to the longitudinal axis of the casing section. The aligning band 12 is then telescoped into the end of one casing section and the end of the other casing section is then telescoped over the aligning band so that the ends of both sections abut the sealing faces 16. Of course, there would have been previously applied to the casing sections the radial lugs or clips 17. The registering clips 17 of the adjoining ends of the casing sections 10 and 11 are then connected together by bolts 20 which are then tightened up to tightly compress the ends of the casing sections 10 and 11 into firm sealing contact with the faces 16 of the sealing ring 15.

In the event that the sealing ring carries a journal member 21 such as shown in Fig. 2, this journal member will be automatically secured and maintained in a proper relative position to the internal diameter of the casing. Likewise when the ends of the casing sections 10 and 11 are telescoped over the aligning band 12, the ends thereof will be brought into precise axial alignment.

I desire to point out here that a coupling member such as I have herein disclosed is very inexpensive to manufacture and provides a rapid and inexpensive medium of coupling casing sections of light material together.

Further, I desire to point out that the joint effected by my coupling means will be watertight under relatively high pressures.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

A coupling means for the adjacent ends of two sections of tubing comprising a circular relatively rigid aligning band of an internal diameter agreeing with the interior diameter of the tubing, a concentric annular sealing ring formed on and projecting from the outer periphery of the band and of an external diameter not less than the external diameter of the tubing, the ring having sealing faces on a plane transverse to the axis of the tubing and substantially spaced from the transverse ends of the band whereby the ends of the tubing may telescope over the external periphery of the band and abut against said faces, radially projecting lugs welded to the exterior of each tubular section in circular fashion and spaced circumferentially about said tubular section at a point short of the end thereof, the lugs of the adjacent ends of the tubing section being in longitudinal alignment, each of said lugs comprising a thin sheet metal strip bent in a U shape and having its legs extended toward the adjacent ends of the tubular sections, and connecting bolts connecting the lugs of the tubular sections together to form a rigid connection therebetween and to force the ends of the tubular sections into sealing contact with the sealing faces of the sealing ring.

FRED F. STADELHOFER.

References Cited in the file of this patent
UNITED STATES PATENTS

| Number | Name | Date |
|---|---|---|
| 235,384 | Russell et al. | Dec. 14, 1880 |
| 1,466,592 | King | Aug. 28, 1923 |
| 1,590,666 | Angell | June 29, 1926 |
| 1,891,424 | Kirkpatrick | Dec. 20, 1932 |
| 2,208,975 | Hait | July 23, 1940 |